Nov. 1, 1932.  S. B. GORBUTT  1,885,254
ARTICULATED DRIVE SHAFT FOR FLAT SCREENS
Filed April 7, 1930  3 Sheets-Sheet 2

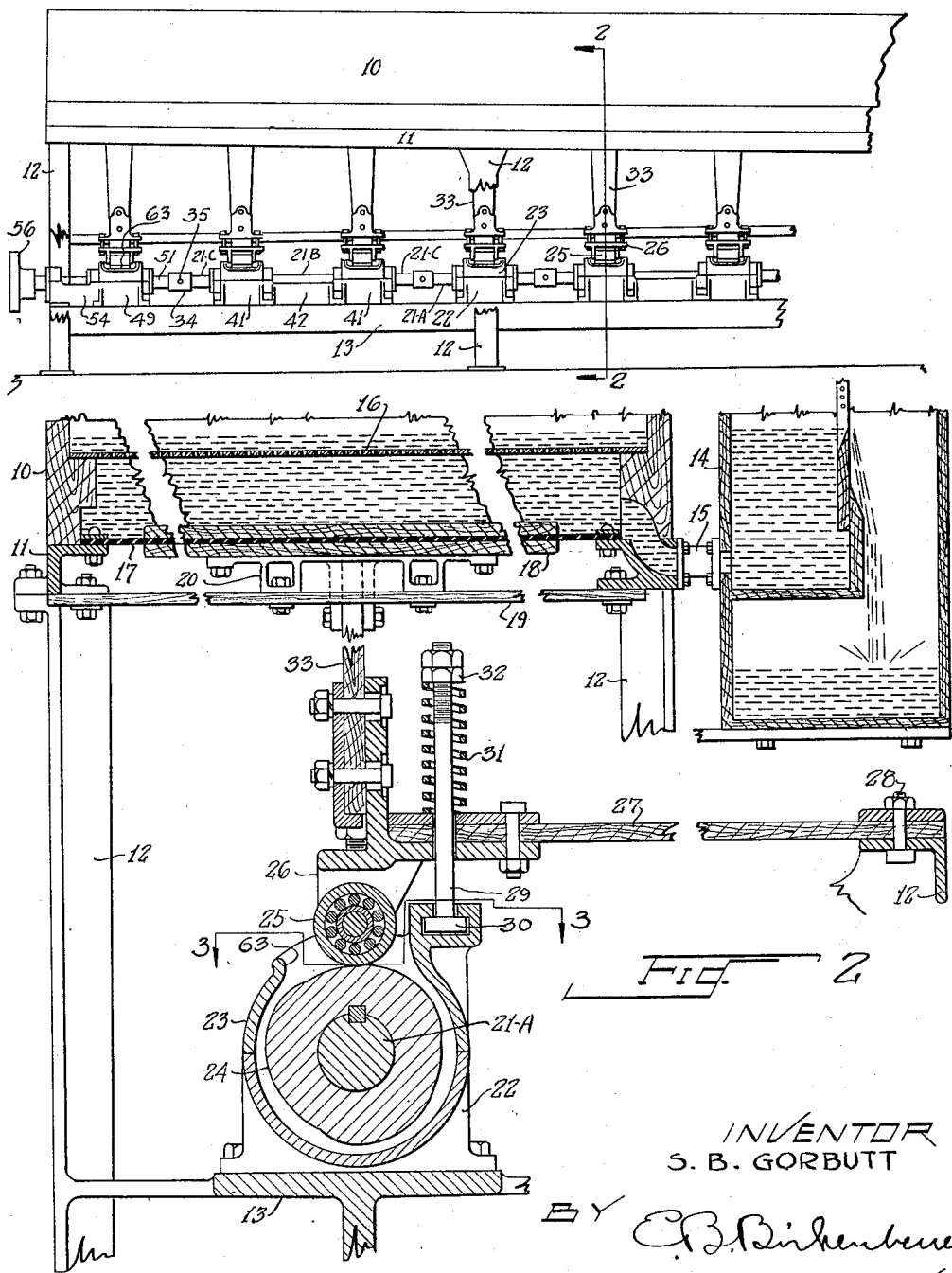

INVENTOR
S. B. GORBUTT
BY C. B. Birkenbeuel
ATTORNEY

Nov. 1, 1932.  S. B. GORBUTT  1,885,254
ARTICULATED DRIVE SHAFT FOR FLAT SCREENS
Filed April 7, 1930   3 Sheets-Sheet 3
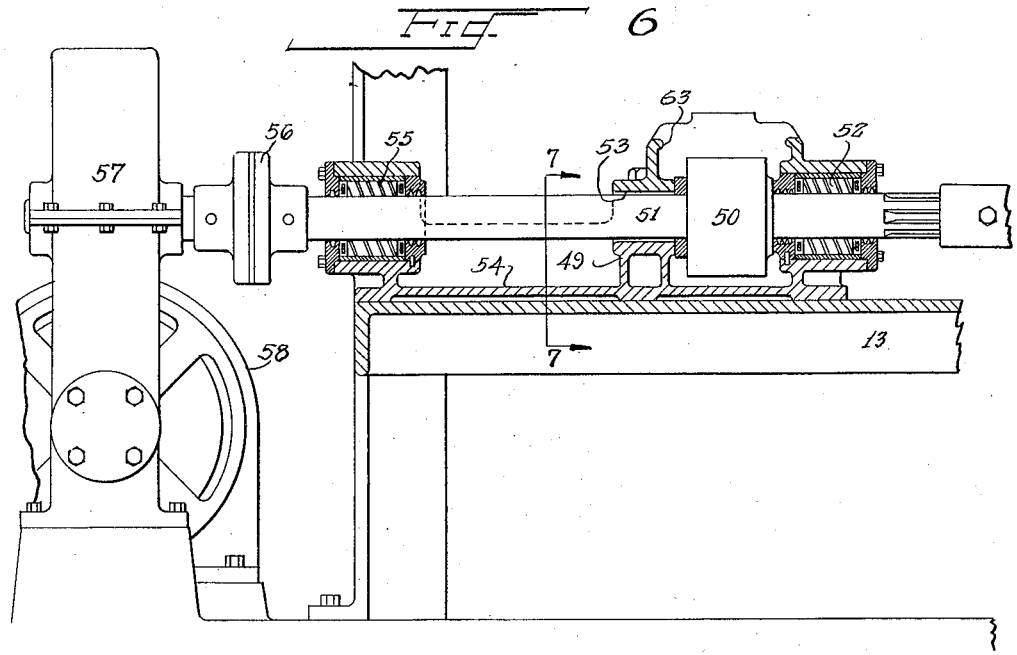
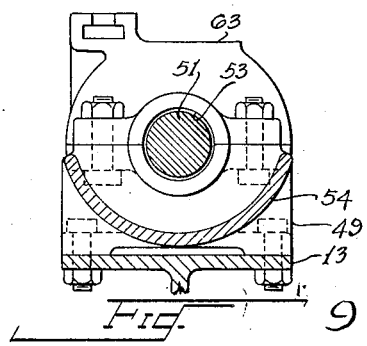
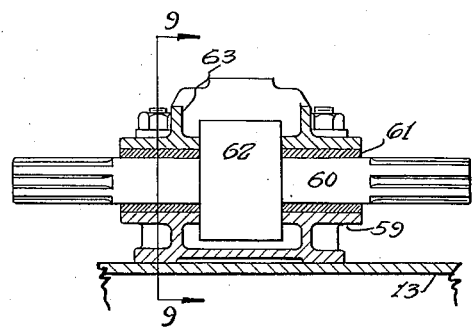
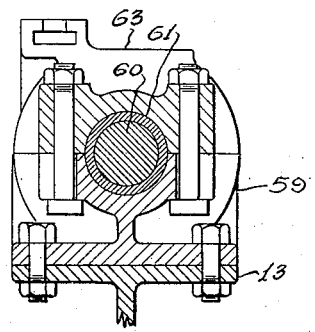
INVENTOR
S. B. GORBUTT
BY
ATTORNEY Patented Nov. 1, 1932

1,885,254

UNITED STATES PATENT OFFICE

SIDNEY B. GORBUTT, OF PORTLAND, OREGON, ASSIGNOR TO ELECTRIC STEEL FOUNDRY COMPANY, OF PORTLAND, OREGON

ARTICULATED DRIVE SHAFT FOR FLAT SCREENS

Application filed April 7, 1930. Serial No. 442,244.

This invention relates generally to the paper making industry, and particularly to means for driving flat screens employed therein.

The main object of this invention is to provide an articulated drive shaft for flat screens in which each section carries one or more cams and in which the various sections are flexibly coupled.

The second object is to provide a construction which will permit the use of anti-friction bearings on flat screen drive shafts.

The third object is to facilitate the construction, assembling and up-keep on the flat screen driving mechanism and to reduce the amount of time ordinarily lost in making repairs.

The fourth object is to produce a shaft drive for flat screens which will not require accurate alignment in order to enable same to operate with a minimum amount of power.

The fifth object is to make it possible to remove one or more sections of the shaft without removing the cams on any of the sections.

The sixth object is to make it possible to remove or renew a bearing on an individual section without touching any of the bearings or cams on the other sections.

The seventh object is to so construct the drive that it will not be limited to any particular type of bearing.

The eighth object is to render it possible to make a closed screen frame as opposed to the open sided frames now required on account of the use of a single piece drive shaft, thereby decreasing the manufacturing cost of the frame and increasing its rigidity for a given weight.

These, and other objects, will become apparent from the specification following as illustrated in the accompanying drawings, in which:

Figure 1 is a side elevation of one end of a shaker screen with portions broken away to show the parts.

Figure 2 is a vertical section along the line 2—2 in Fig. 1.

Figure 6 is a vertical section through a unit employing what are known as "Hyatt" bearings.

Figure 7 is a vertical section along the line 7—7 in Fig. 6.

Figure 8 is a vertical section through a plain bearing.

Figure 9 is a vertical section along the line 9—9 in Fig. 8.

Similar numbers of reference refer to similar parts throughout the several views.

Figure 3:
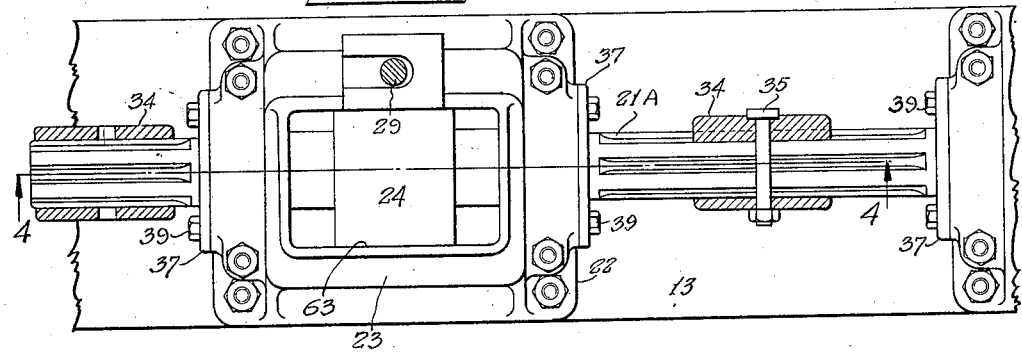
Figure 3 is a plan of a single unit of the drive shaft along the line 3—3 in Fig. 2.

Referring in detail to the drawings, there is shown a screen box 10 which is supported on the sloping base 11 which, in turn, is carried by a series of spaced side frames 12 which are joined at their lower ends by a longitudinal shelf member 13. There is also shown a flow box 14 which communicates with the screen box 10 by means of a pipe 15. In the screen box 10 is mounted the usual screen plate 16 and a rubber diaphragm 17 which is clamped between the boards 18 and supported on the spring board 19 by means of a clamp 20. The spring board 19 is supported at its ends from the base 11.

The construction thus described is common in present-day paper making machinery.

Referring particularly to my invention, which is the means for imparting a vibratory motion to the rubber diaphragm 17, attention is drawn to Fig. 1 in which a shaft 21A is supported in the bearing base 22 which is provided with a cap 23. Within the base 22 and cap 23 and keyed to the shaft 21A is a cam 24 on which rides a roller 25 carried by a forked arm 26 which is secured on the end of the spring arm 27 whose opposite end is secured to the side frame 12 by means of the bolt 28. A bolt 29 has its head 30 mounted in a key slot in the cap 23 and itself passes loosely through the arm 26 and carries on its upper end a spring 31 whose compression is regulated by the nuts 32. Between the arm 26 and the clamp 20 is a connecting link 33 which transmits movement from the roller 25 to the rubber diaphragm 17.

The details and advantages of this construction are fully described in my copending application filed January 21, 1930, Serial Number 422,265.

Referring again to the present invention, and this time particularly to the form shown in Fig. 3, it will be seen that the drive shaft 21—A extends from each end of the bearing base 22 and is splined at each end to receive the coupling 34. The coupling 34 is held in position by means of a bolt 35.

In Figure 3 one coupling 34 is shown in a driving position and the other one moved toward the bearing for the purpose of permitting the removal of an adjacent shaft.

Figure 4:
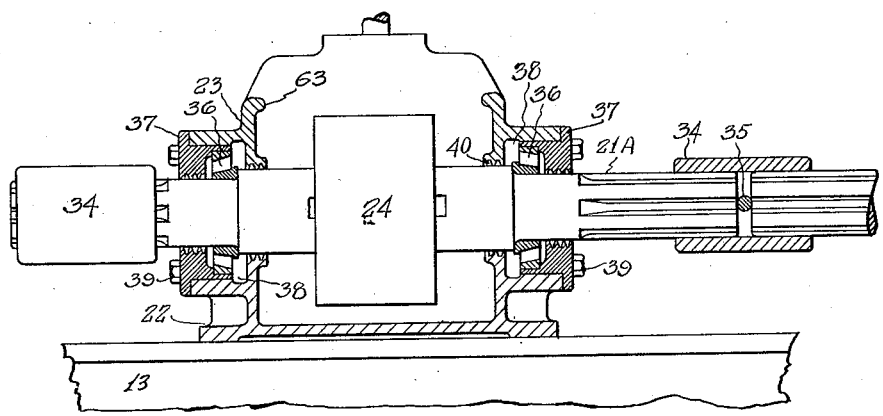
Figure 4 is a vertical section along the line 4—4 in Fig. 3 showing "Timken" bearings.

End thrust is taken care of in this form of the device by shouldering the shaft 21—A (as shown in Fig. 4) and providing a "Timken" bearing 36 at each shouldered shaft portion. Each bearing 36 is confined within a retainer 37 which is itself mounted in a recess 38 formed within the base 22 and cap 23 and is secured therein by means of the screws 39. Lubricant is prevented from escaping from the bearings 36 by means of the felt rings 40.

Figure 5:
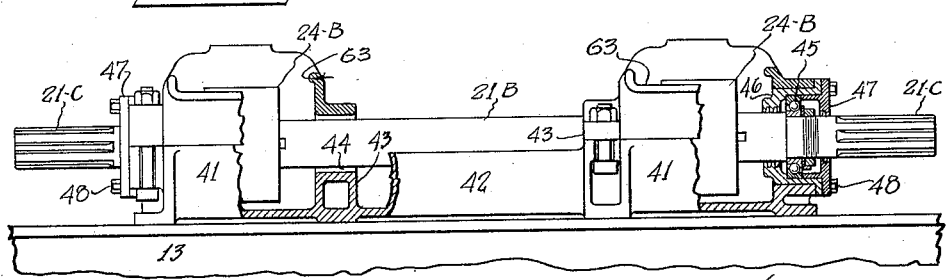
Figure 5 is an elevation of a double unit in which are employed ball bearings showing portions broken away in vertical section.

In Fig. 5 a somewhat similar construction is employed except that instead of a single cam having a bearing on each side of same (as just described) two cams 24—B are mounted on the shaft 21—B whose ends 21—C are splined. In this form of the device two spaced housings 41 are employed which are held in relation to each other by a channel shaped connecting bar 42. The innermost ends 43 of the housings 41 are provided with openings 44 through which the shaft 21—B freely passes. The outer end of each housing 41 contains a ball bearing 45 which is held within the flanged sleeve 46 by means of a retainer 47. The sleeve 46 and the retainer 47 are held in position within the housing 41 by means of the bolts 48.

With this form of the device a single shaft unit is supported on a pair of spaced bearings 45 which are held in alignment by the connecting element 42.

In the form of the device shown in Fig. 6 another modification is shown. The housing 49 contains a cam 50 which is secured on the shaft 51. In this instance the "Hyatt" roller bearing 52 is provided at one end of the housing 49 and the opposite end of the housing 49 is provided with a free opening 53. In this case the housing 49 is provided with an extension base 54 on the opposite end of which is mounted a single "Hyatt" roller bearing 55 through which projects the shaft 51 and on which projecting end is placed the coupling 56 through which the shaft 51 is driven from the speed reducing mechanism contained within the casing 57, power being supplied from the motor 58, or from any other convenient source.

In Figures 8 and 9 there is illustrated a housing 59 in which the shaft 60 is supported by the plain bearings 61 between which is a cam 62 which is secured on the shaft 60. It will be noted that in each instance the caps which are placed over the cams are provided with a cut-away portion 63 through which the roller 25 contacts with its cam.

It will be seen from the above that the device adapts itself to various forms of anti-friction and plain bearings, the former, of course, being more desirable, but have not been employed in the past owing to the fact that all of these bearings must be slipped over the end of the shaft, and if a single bearing or cam had to be removed it meant that the entire shaft assembly had to be taken down, and if the cams were shrunk on the shaft, as is usually the case, it required no small amount of labor to perform this operation. Therefore, plain split bearings are now universally used and in some instances split cams are employed, although these are obviously objectionable.

By employing an articulated shaft composed of sections of one and two unit cams the device readily adapts itself to any type of flat screen, regardless of the number of screen units it contains or the positioning of the supporting frames 12. In some instances the single cam unit works in better than the double, and in other instances the reverse is true.

I claim:

1. A flat screen the combination of an elongated screen box having a series of vibrator diaphragms forming the bottom thereof, and an elongated articulated drive shaft parallel with the length of the screen box for vibrating said diaphragms consisting of a plurality of sections of shafting flexibly joined, each of said sections having diaphragm operating means mounted thereon and having anti-friction bearings on both sides of said diaphragm operating means.

2. In a stock screen the combination of a plurality of spaced upright frame members for supporting an elongated stock screen, an articulated drive shaft for operating said screen parallel with and located under said screen consisting of a plurality of substantially coaxial shaft sections, each of said sections having a pair of bearing members, each of said sections being less in length than the spacing of said upright frames, and flexible driving connections between the sections of said shaft.

SIDNEY B. GORBUTT.